United States Patent [19]

Cherry

[11] Patent Number: 4,496,171

[45] Date of Patent: Jan. 29, 1985

[54] MEDIA GUIDE

[76] Inventor: Martin Cherry, 550 E. Grand Ave., Beloit, Wis. 53511

[21] Appl. No.: 426,610

[22] Filed: Sep. 29, 1982

[51] Int. Cl.[3] ...................... B42B 15/00; G09B 29/04; G09F 9/00

[52] U.S. Cl. ........................................ 283/61; 283/34; 283/56

[58] Field of Search ........................ 283/61, 34, 62, 35, 283/904, 81, 79, 56; 281/2, 5, 19 A, 22 A, 24 B, 27; 273/139; D20/10

[56] References Cited

U.S. PATENT DOCUMENTS 363,907 5/1887 Nelson ................................. 283/34
2,179,172 11/1939 Bonnaire .............................. 283/35
4,289,333 9/1981 Gaetano ............................... 283/35

*Primary Examiner*—Paul A. Bell
*Assistant Examiner*—Paul M. Heyrana, Sr.
*Attorney, Agent, or Firm*—Hill, Van Santen, Steadman & Simpson

[57] ABSTRACT

A self-indexing television program guide and advertising medium with printing on both surfaces of a sheet with the sheet provided with precreased foldlines in predetermined locations with a laterally extending first foldline located a small distance about the page center to leave a laterally extending third indexing strip at the lower edge of the back surface of the sheet when folded about the first line, a third program printed on the back surface for each day of the week, second and third aligned foldlines located above the center of the lower edge of the sheet when folded above the first line leaving a second indexing strip with a second program containing weekday, Saturday and Sunday features, and a third program on the exposed surface of the sheet when folded above all of the foldlines containing programs of specials, sports and movies with the programs interrelated so that a user moves from said first to said second to said third program for progressively detailed program information and advertising information printed adjacent each of the programs for exposure to the user to the information with folding change to each of the programs.

9 Claims, 5 Drawing Figures

MEDIA GUIDE

BACKGROUND OF THE INVENTION

The present invention relates to an improved and unique structural arrangement on a rectangular sheet to provide usable television program information with advertising contained with the television programming.

In programs of this type, it has been conventional to provide weekly television program sheets to users either delivered with other publications or sold separately which provides the user with television listings, and this vehicle is provided to included advertising material so that the television viewer will be subjected to the advertising information when viewing the program listing. Presently, newspapers, shoppers and other T.V. data products are designed in a magazine format, whether that be in full or small tabloid size using standard or small magazine (saddle-stitched) techniques.

An essential of these formats is that the pages must be turned or folded over in order to get the T.V. program information. A disadvantage of this format to an advertiser is that unless the advertiser purchases the front or back cover location, the exposure to readers is generally limited to the specific page usage. That is, an ad on Tuesday's listings is not seen before Tuesday or on the day after the listings have application. Therefore, whereas the advertiser has been sold a media with seven-day usage possibilities, in fact, only one day exposure is provided, and essentially each ad is a partially wasted space from the standpoint of the provision of paper and print.

It is accordingly an object of the present invention to provide a unique program sheet structure which has a unique folding and printing arrangement that gives exposure to the reader with almost every use, and in fact, normal usage will compel exposure of all of the ads to the user for essentially seven days a week rather than only on one day of the week.

In radio and T.V. guides such as heretofore used with many newspapers, the service is not self-paying or self-amortizing, and the publishers will print the guide on a large sheet of paper without keying advertising to it because there has been no convenient or useful arrangement accessible which would insure the success of the advertising messages. In certain metropolitan areas where special T.V. guides are printed, this often requires special press runs where even though advertising is included, it is not a paying proposition with respect to the publisher. The fact that small T.V. guides which are conveniently usable are arranged so that a daily programming is contained on each page, involves exposure by the reader to the advertising contained on the page only one day a week, and consequently, advertising space becomes more expensive than the results would justify. It is desirable to obtain a T.V. guide that is convenient for the user to utilize, can be run off on an economical size press run, can be used by medium and small size newspapers as a source of advertising revenue and give multiple exposures to all members of the family more than one time a week.

It is accordingly a further object of the invention to provide an improved T.V. guide construction which avoids the disadvantages present in arrangements heretofore used and which utilizes a fold sequence and program location arrangement such that the user is essentially compelled to view the printed advertising surfaces with each use and which results in a self-indexing feature providing improved surface and better usage for the user along with the simultaneous attainment of increased advertising exposure.

Other objects, advantages and features will become more apparent with the teaching of the principles of the invention in connection with the disclosure of the preferred embodiment thereof in the specification, claims and drawings, in which:

DESCRIPTION OF THE PREFERRED EMBODIMENT

Figure 1:
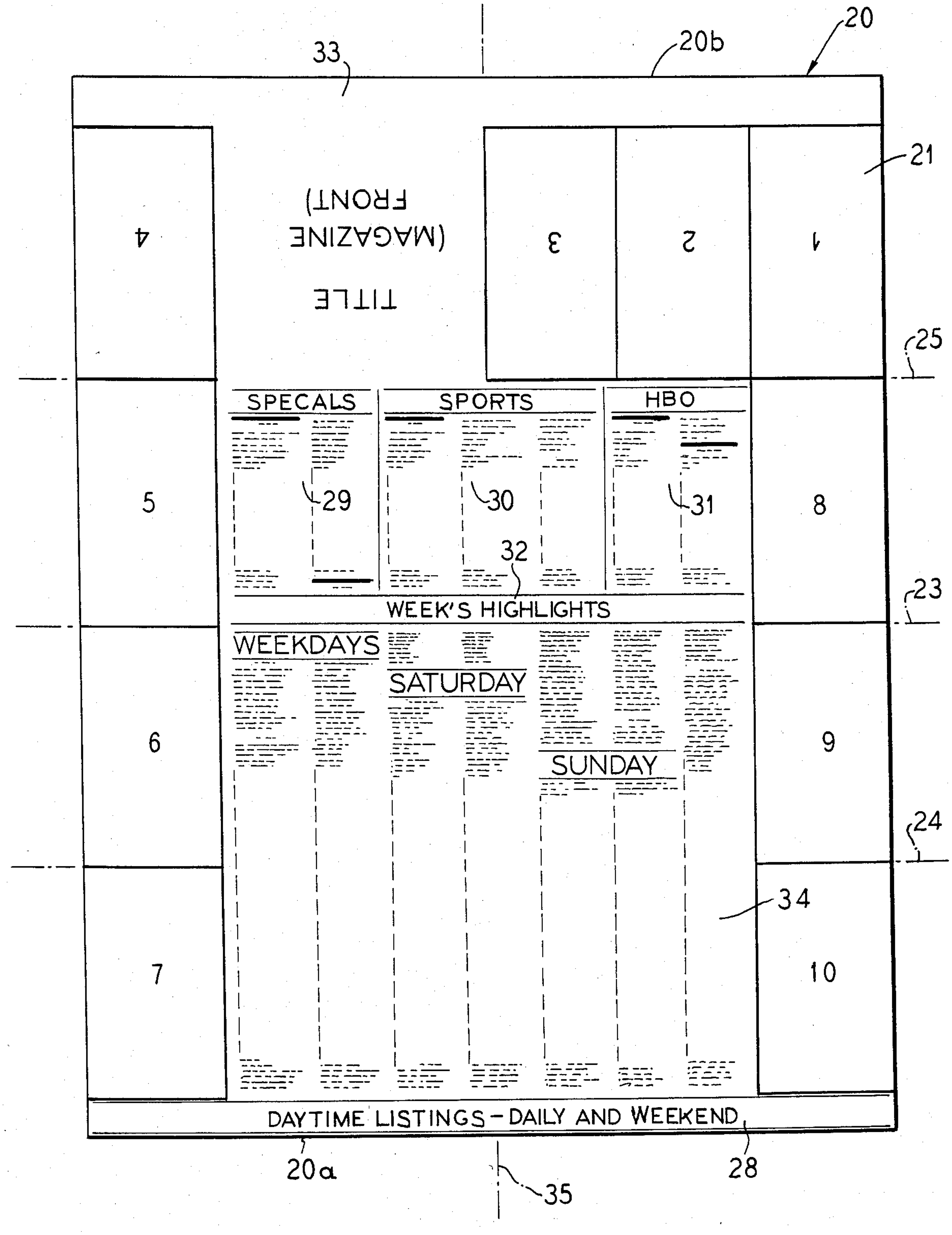
FIG. 1 is a plan view of the front surface area arrangement of a sheet constructed and arranged in accordance with the principles of the present invention.
Figure 2:
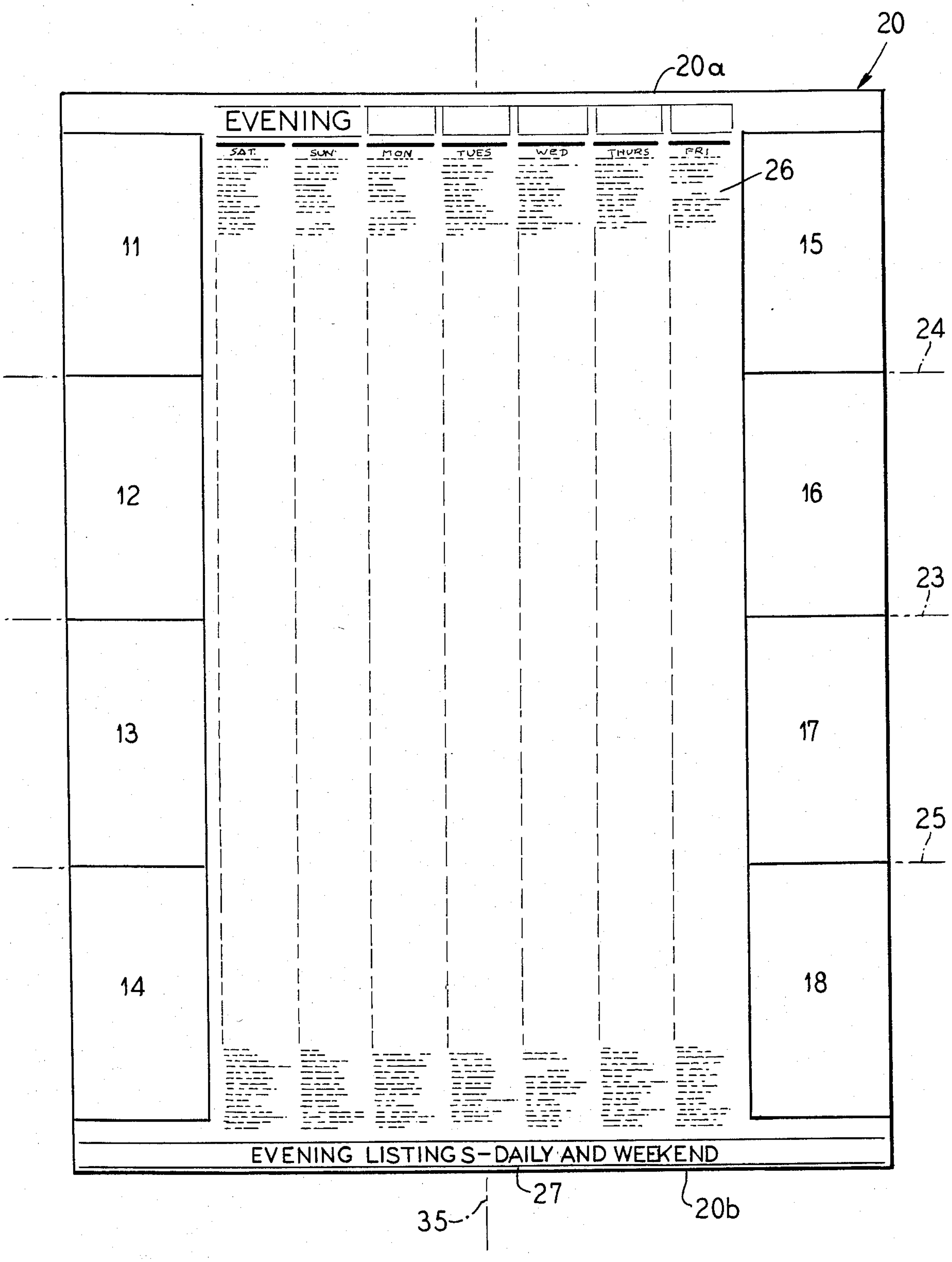
FIG. 2 is a plan view of the back surface of the sheet of FIG. 1.

FIGS. 1 and 2 illustrate respectively the front and back surfaces of a sheet 20 having a top edge *20a* and a bottom edge *20b*.

Figure 3:
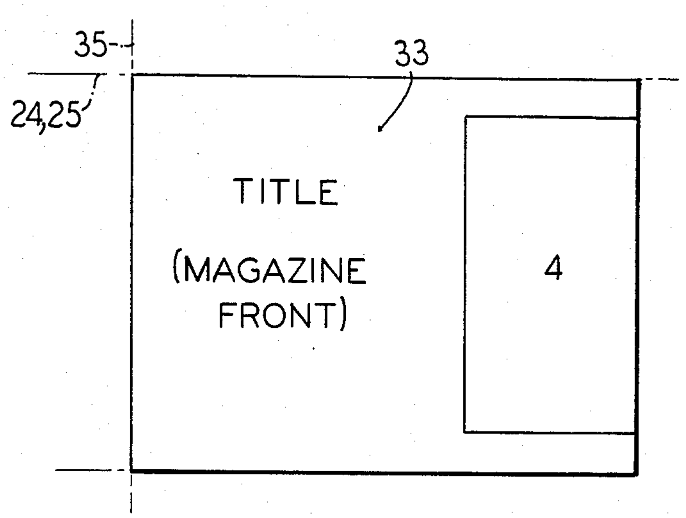
FIG. 3 is a plan view of the sheet folded along pre-creased fold lines showing its appearance when received by the user.

The sheet is arranged with a central area that contains the television or radio program listings with the central areas being used for this purpose on both the front surface, FIG. 1, of the sheet and the back surface, FIG. 2. Along the sides of the sheet are advertising spaces with the advertising spaces being shown by numerals in the center of spaces. When the sheet is completely folded, as shown in FIG. 3, a magazine front is printed on the sheet in the area 33 containing its title and a magazine type picture. The area designated at 4 is one of the advertising spaces. On the back side of the folded sheet as it appears in FIG. 3, are three advertising spaces shown in areas 1, 2 and 3 in FIG. 1. These numerals are shown upside down inasmuch as this is the position they will take when the sheet is located as is shown in FIG. 1 and will be upright when the sheet is folded as it appears in FIG. 3. The advertising areas are numbered 1 through 18, and a preferred manner of selling and displaying the advertising spaces is to sell and advertiser one of the spaces and with each week, his space changes or progresses from area 1 to area 2 and so forth until his ad has been located in all of the 18 spaces. His space will thus rotate almost three times in a year's time.

The sheet is uniquely folded with a first laterally extending foldline 23 extending essentially mid-page of the center of the sheet, but located a small distance above the page center. The purpose of locating the foldline 23 a small distance above the center is to leave exposed a laterally extending third indexing strip 27. This indexing strip preferably extends the width of the sheet and designates the content of the third program 26. A third program is the full weekly evening television program arranged by the days of the week with one column for each of the seven days, as illustrated in FIG. 2. Thus, when the sheet is fully opened so that the viewer sees the entire back area (which is the last step in unfolding), the sheet will appear as it is illustrated in FIG. 2.

The sheet is provided with second foldlines 24 and 25 which are so positioned so that they are aligned with each other when the sheet is doubled in half about the first foldline 23. This is illustrated in FIG. 5 where the two foldlines 24 and 25 coincide.

Figure 5:
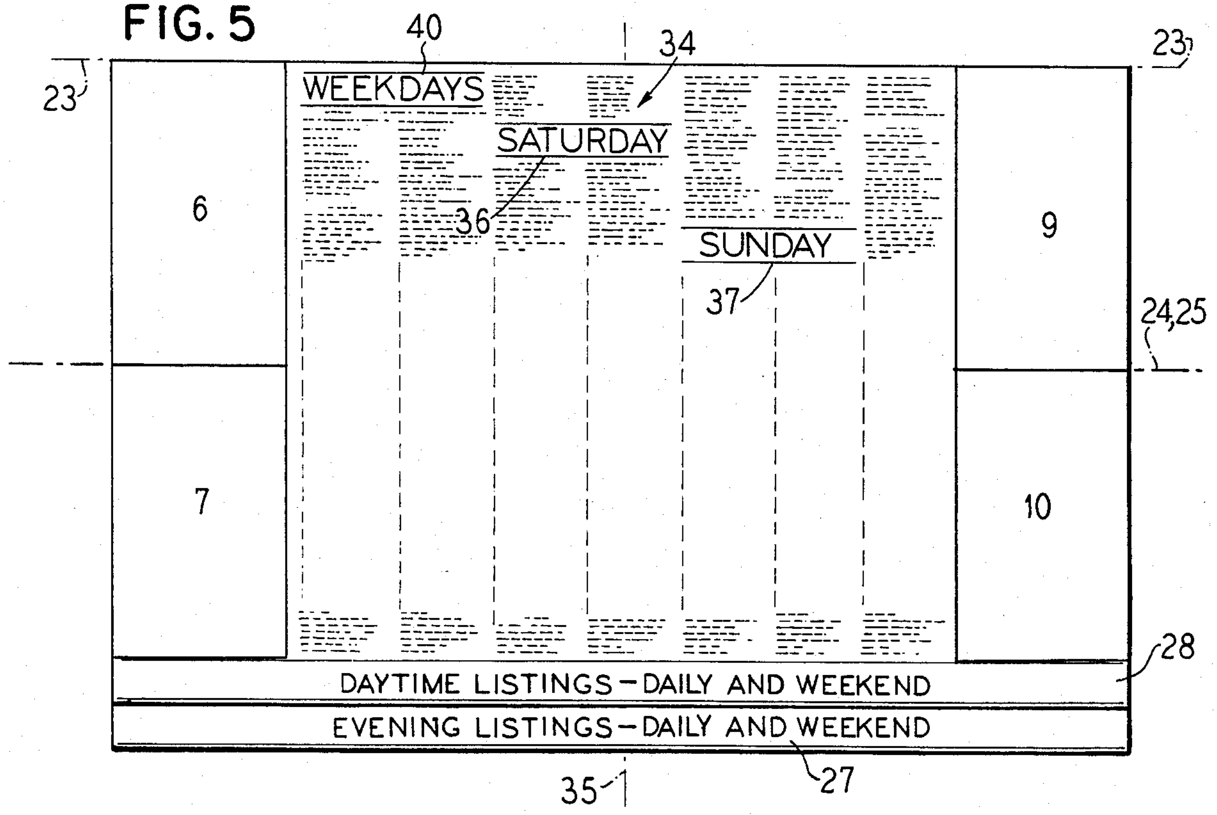
FIG. 5 is a plan view of the sheet illustrating its appearance after being opened by unfolding along the second and third foldlines of FIG. 4.

When the sheet is folded to the position of FIG. 5, that is about the first foldline 23, the television program area 34 is exposed, and this program is arranged in three separate columnar areas 40, 36 and 37 which are weekday programs, Saturday programs and Sunday programs.

Figure 4:
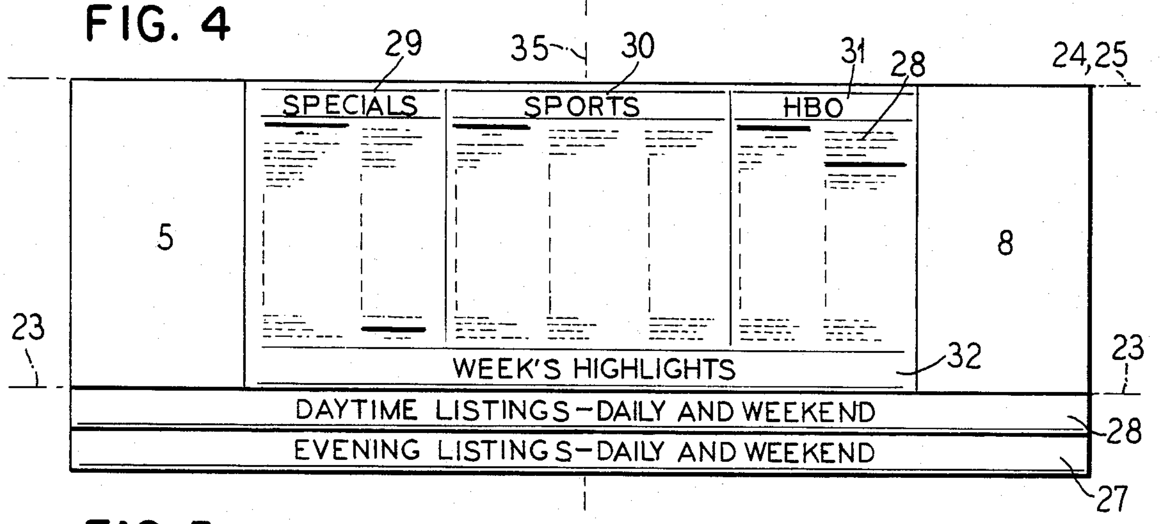
FIG. 4 is a plan view of the sheet opened along the fourth foldline from the position of FIG. 3.

When the sheet is additionally folded about the second and third foldlines 24 and 25, it has the appearance illustrated in FIG. 4. In this position, a second indexing strip 28 is exposed, which actually is at the upper edge of the front of the sheet as illustrated in FIG. 1. This strip 28 identifies the day-time listings.

When the sheet is folded as illustrated in FIG. 4, the week's highlights are exposed which are preferably specials, sports and movies. In this position advertising spaces 5 and 8 will appear to the viewer.

One additional foldline is provided, the fourth foldline 35 which extends vertically down the center of the sheet, and the sheet is folded about a line 35 from the position of FIG. 4, to expose the title area 33 and advertising space 4.

In preparing the sheet, the front is printed as illustrated in FIG. 1, and the back is printed as illustrated in FIG. 2. The sheet is first folded about the first foldline 23 with the back surfaces brought toward each other, and the sheet then will have the appearance shown in FIG. 5. It is next folded about the coincident second and third foldlines 24 and 25 to have the appearance in FiG. 4. It is next folded about the vertical fourth foldline 35 to have the appearance shown in FIG. 3.

In use, the viewer receives the folded sheet having the appearance of FIG. 3 with a magazine title area 33 and advertising space 4. On the back surface of sheet thus folded will appear advertising spaces 1, 2 and 3. When the user wishes to review television programs, he first opens the sheet unfolding along the fourth foldline 35 and is presented the first program 28 as shown in FIG. 4, which in a preferred form are the week's highlights. In that position, he is exposed to advertising spaces 5 and 8. The programs are interrelated so that to obtain successive details of the programs, the user must progressively go through two additional unfolding operations. He first unfolds along the second and third foldlines 24 and 25 to where the sheet has the appearance of FIG. 5 and he then is presented with the standard weekday program as well as the Saturday and Sunday day-time program. In that position of the sheet, he is exposed to advertising spaces 6, 7, 9 and 10.

From the weekday and Saturday and Sunday daily programs, he will normally want to progress to review the evening programs for each of the days of the week, and this requires unfolding along the first foldline 23 to view the entire back surface of the sheet, as it appears in FIG. 2. The evening programs are shown in area 26 in FIG. 2 and are arranged in columns with one column for each day of the week. In this position of the sheet, the viewer is exposed to advertising spaces 11 through 18.

Then, to refold the sheet to an easily handleable arrangement, such as the user will wish to do to have the highlights before him, will require folding the sheet back to the condition shown in FIG. 4, and during the folding operation, he will again be exposed to each of the advertising spaces at the sides of the sheet area, and as the user finishes the final fold of the program sheet, it will have the appearance shown in FIG. 3 where he will be exposed to advertising area 4 on the front and advertising areas 1 through 3 on the rear.

In summary, when the first fold is opened starting from the arrangement in FIG. 3 and going to the arrangement of FIG. 4, base information such as weekly specials, sports or movies are provided. This means a regular return to this position by the reader in order to get information on later days than the first use.

When the next fold opening is utilized, unfolding along second and third foldlines 24 or 25, this provides the Saturday and Sunday day-time data, and in some cases weekly information. When the third opening is performed, by unfolding along first foldline 23, this provides a presentation of all seven evening T.V. programming schedules. by doing this in the vertical listing (one column per night fashion) the guide not only provides a means to read down for that night, but also the ability to read across (horizontal) to gain information for all other nights of the week, and therefore the reader can be assisted in determining interest for specific nights at a glance as well as within certain time frames, that is, by reading across between 7:00 P.M. to 10:00 P.M., it is easy to see all prime time movies, specials or programs to be shown for the entire week. This is an advantage for determining plans for T.V. watching.

In the the process of doing each of the steps referred to above, and with all ads located in positions adjacent to the T.V. information, the reader is exposed to most advertisers in the process of opening and refolding the T.V. listing. Therefore, a multiple per day, multiple members of the family and multiple per week exposure of advertising the readers is created. This is not possible with other printed media or specific T.V. listing that has heretofore been available.

The unique folding arrangement provides convenient indexing to T.V. programming. The advertising locations give exposure to the reader with almost each use, and rotation of the positions with each issue will further enhance exposure. Listings include all movie and descriptions of specials plus regular day-time and evening schedules. In addition, week's features and highlights columns are included. The above items are indicated as most desirable according to discovery of consumer requirements.

It is possible to provide this arrangement with inexpensive paper, but quality offset paper improves handling and life. Different color stock or ink may be used to differentiate different weekly issues. The small size which results is convenient for home use and in conjunction with movie or Home Box Office guide.

What is provided is an automatic self-indexing program which allows maximum exposure on a daily basis and multiple exposure on a weekly basis to all members of the family. This attains a more useful, more usable guide with substantial additional value in that it provides for advertising exposure because of the multiple exposure attained.

Thus, it will be seen that I have provided a self-indexing television program guide and advertising medium construction which meets the objectives and advantages above set forth, and which avoids disadvantages and obtains features not heretofore available.

I claim as my invention:

1. A self-indexing television program guide and advertising medium comprising in combination:

a rectangular sheet containing program areas with indexing strip areas at the base of each of the program areas and a plurality of advertising areas on a front surface and on a back surface and provided with precreased foldlines in predetermined locations interrelated to said program areas;

a first laterally extending foldline located a small distance above the sheet center to leave exposed a laterally extending third indexing strip at the lower edge of said back surface accommodating folding of the back surface areas toward each other;

a third program printed on said back surface above said third indexing strip providing a program for each day of the week;

second and third laterally extending foldlines located slightly above the center of the lower edge of the sheet when folded about said first foldline and lying together when the sheet is folded about the first foldline leaving exposed a laterally extending second indexing strip at the lower edge of the folded front surface below said first foldline and a second program lying above the second indexing strip having day-time, daily and Sunday programs;

a first program on the portion of the front surface exposed when the sheet is folded on said first, second and third foldlines containing sports, movie and special programs, said programs interrelated so that a user moves from said first to said second to said third program for progressively detailed program information; and advertising information adjacent each of said programs for exposing the user to said information with folding change to each of said programs.

2. A self-indexing television program guide and advertising medium constructed in accordance with claim 1:

wherein said first program is arranged in block areas each headed by a title of the program.

3. A self-indexing television program guide and advertising medium constructed in accordance with claim 1:

said second program being arranged in block arrangements each headed by a title of the program in the block.

4. A self-indexing television program guide and advertising medium constructed in accordance with claim 1:

wherein said advertising areas are arranged in blocks so that the information can be progressively rotated on a week-to-week basis in accordance with program change.

5. A self-indexing television program guide and advertising medium constructed in accordance with claim 1:

wherein said advertising information is arranged in blocks so that the information can be progressively rotated on a week-to-week basis in accordance with program change.

6. A self-indexing television program guide and advertising medium constructed in accordance with claim 5:

wherein each of said front and back surfaces of the sheet contains additional advertising information arranged in four blocks with the blocks situated so that they require approximately one-fourth of the page in height.

7. A self-indexing television program guide and advertising medium constructed in accordance with claim 1:

and including a fourth foldline which extends vertically with the first program doubled upon itself when folded about the fourth foldline.

8. A self-indexing television program guide and advertising medium constructed in accordance with claim 7:

and including a magazine identification title on the front surface of the sheet when folded about each of the four foldlines.

9. A self-indexing television program guide and advertising medium comprising in combination:

a sheet containing programming areas and advertising areas on a front surface and on a back surface and provided with foldlines in predetermined locations interrelated to said programming areas;

a first laterally extending foldline located a small distance about the center of the sheet to leave a laterally extending third indexing strip at the lower edge of the back surface and accommodating folding of the back surfaces toward each other;

a second program about a second indexing strip exposed on the first surface when the sheet is folded about said first foldline;

a third program printed on said back surface about the third indexing strip;

second and third laterally extending foldlines located slightly about the center of the sheet when folded about the first foldline and lying together when the sheet is folded about the first foldline and leaving exposed the laterally extending third indexing strip at the lower edge of the front surface when the sheet is folded about said foldlines;

a first program on the portion of the front surface exposed when the sheet is folded about said first, second and third foldlines, said programs interrelated so that a user moves from said first to said second to said third programs for progressively detailed programming information; and advertising information printed adjacent said programs for exposure of a user of said information with folding change for each of the programs.

* * * * *